United States Patent [19]

Scott

[11] 4,235,847

[45] *Nov. 25, 1980

[54] VAPOR/LIQUID DISTRIBUTOR FOR FIXED-BED CATALYTIC REACTION CHAMBERS

[75] Inventor: Norman H. Scott, Arlington Heights, Ill.

[73] Assignee: UOP Inc., Des Plaines, Ill.

[*] Notice: The portion of the term of this patent subsequent to Jan. 9, 1996, has been disclaimed.

[21] Appl. No.: 917,606

[22] Filed: Jun. 21, 1978

Related U.S. Application Data

[63] Continuation-in-part of Ser. No. 848,700, Nov. 4, 1977, Pat. No. 4,138,327.

[51] Int. Cl.³ ................................................ B01J 8/02
[52] U.S. Cl. .................................. 422/220; 422/195; 208/49; 208/146
[58] Field of Search ................. 208/146, 49; 422/195, 422/220

[56] References Cited

U.S. PATENT DOCUMENTS

| | | | |
|---|---|---|---|
| 2,877,099 | 3/1959 | Bowles | 422/195 |
| 2,981,677 | 4/1961 | Bowles | 208/146 |
| 3,146,189 | 8/1964 | Kunreuther et al. | 208/146 |
| 3,378,349 | 4/1968 | Shirk | 422/195 |
| 3,524,731 | 8/1970 | Effron et al. | 208/146 |
| 3,652,450 | 3/1972 | Boyd | 208/146 |
| 3,685,971 | 8/1972 | Carson | 422/200 |
| 3,697,416 | 10/1972 | Carson et al. | 208/146 |
| 3,723,300 | 3/1973 | Carson et al. | 208/146 |
| 4,133,645 | 1/1979 | Scott | 208/146 |

Primary Examiner—Bradley R. Garris
Attorney, Agent, or Firm—James R. Hoatson, Jr.; Robert W. Erickson; William H. Page, II

[57] ABSTRACT

A distributor device for effecting the uniform distribution of a mixed-phase vapor/liquid reactant stream across the upper surface of a fixed-bed of catalyst particles. Mixed-phase reactants or components are first separated into a principally vapor-phase and a principally liquid-phase. These separated phases are then re-mixed in a manner which creates a vapor/liquid froth; the latter being re-distributed to the upper surface of the bed of catalyst particles. Briefly, the distributor comprises three chordal-form, catalyst-free volumes which are defined by the interior surface of the chamber and three pairs of spaced-apart, parallel chordal baffles.

7 Claims, 6 Drawing Figures

VAPOR/LIQUID DISTRIBUTOR FOR FIXED-BED CATALYTIC REACTION CHAMBERS

CROSS REFERENCE TO RELATED APPLICATION

The present application is a Continuation-In-Part of my copending application, Ser. No. 848,700, filed Nov. 4, 1977 and issued as U.S. Pat. No. 4,138,327 on Feb. 6, 1979, all the teachings of which copending application are incorporated herein by way of specific reference thereto.

APPLICABILITY OF INVENTION

The method for effecting uniform distribution of a mixed-phase reactant stream to a fixed-bed of catalyst particles and the distributor apparatus therefor, encompassed by my inventive concept, are intended to be applied to processes widely practiced within the petrochemical and petroleum industries. Furthermore, the present invention is specifically directed toward the distribution of a mixed vapor/liquid phase to a fixed-bed of catalyst particles disposed within a catalytic reaction chamber. As such, it is well-suited for use (1) to distribute the reactant stream as it initially enters the reaction chamber and, (2) to distribute the mixed-phase effluent from one distinct bed of catalyst particles into the next succeeding lower bed of catalyst particles. Essentially, it is intended to utilize the present technique and apparatus in those catalytic reaction systems in which the vapor/liquid reactant stream flows cocurrently and downwardly. Similarly, it may be employed to distribute two heterogeneous liquids.

Although mixed-phase reactions are found in both petroleum refining and petrochemical processes, they appear to be more prevalent in the former; therefore, the following discussion will be limited to catalyzed hydrocarbon conversion reactions without, however, the intent to unduly restrict the broad scope of the invention herein described. Mixed-phase hydrocarbon conversion reactions are generally effected in those processes where the fresh feed charge stock predominates in hydrocarbons boiling above the naphtha boiling range—i.e. above a temperature of about 400° F. In many cases, the vapor/liquid reactant stream consists of liquid hydrocarbon constituents and a vapor phase which is concentrated in hydrogen. Charge stocks include kerosene fractions, light and heavy gas oils (both atmospheric and vacuum) and asphaltenic black oils containing constituents boiling above about 1050° F. Obviously, my invention does not rely for viability upon a particular hydrocarbonaceous charge stock, nor upon the particular reaction, or reactions being effected. The latter include hydrocracking, hydrogenation, desulfurization, denitrogenation, hydrotreating and combinations thereof, all of which are hydrogen-consuming and, therefore, principally exothermic in nature.

Paramount to successfully effecting hydrogen-consuming reactions in mixed-phase processing is the uniform distribution of the reactant stream to the fixed-bed of catalyst particles. Where a given reaction chamber contains more than one distinct bed of catalyst particles, uniform distribution of the reactant stream from a preceding bed to a succeeding bed must also be effected. Tantamount to hydrogen-consuming reactions is the continuous intimate contact of hydrogen with the hydrocarbonaceous reactants, not only at the initial portion of the catalyst bed, but also throughout the same as the reactant stream flows downwardly therethrough. The tendency for liquid and vapor constituents to segregate and seek separate paths while traversing the bed of catalyst particles is commonly known and referred to in the art as "channelling". As hereinafter indicated, the detrimental effects of channelling are well known and a multiplicity of devices have been provided in attempts to alleviate the same.

The technique and apparatus herein described is also directed toward uniform distribution of a mixed-phase reactant stream to a fixed-bed of catalyst particles; however, provision is made to provide for continued intimate vapor/liquid contact as the reactant stream traverses the catalyst bed. Briefly, the technique involves three distinct operations effected in an apparatus having three individually distinct zones. The mixed-phase reactant stream, whether initially introduced into the reaction chamber, or emanating from one catalyst bed for introduction into a succeeding catalyst bed, is first separated into a substantially liquid-free vapor-phase and a substantially vapor-free liquid-phase. These are subsequently re-mixed in a fashion which creates a vapor/liquid froth, or foam-like mixture; this froth is then re-distributed to the bed of catalyst particles. The use of the term "froth" in the present specification and appended claims is intended to allude to a semi-stable, intimate dispersion of a liquid in a vapor phase. The liquid takes the form of extremely fine droplets which are dispersed in a continuous vapor phase which gradually collapses as the froth traverses the bed of catalyst particles.

OBJECTS AND EMBODIMENTS

A principal object of my invention is to provide uniform distribution of a mixed-phase vapor/liquid reactant stream to a fixed-bed of catalyst particles. A corollary objective is to afford a technique which produces a decrease in the vapor/liquid "channelling" effect as the reactant stream traverses the bed of catalyst particles.

A specific object of the invention as herein described is to provide a vapor/liquid distributor device which can initially distribute the reactant feed stream to the uppermost catalyst bed, or function intermediate two catalyst beds to distribute the mixed-phase effluent from an upper catalyst bed uniformly to the next succeeding lower catalyst bed.

Still another object is directed toward uniform introduction of a vapor/liquid mixed-phase, to a bed of catalyst particles, in a form which possesses the capability of resisting segregation and subsequent channelling as it traverses the catalyst bed.

Therefore, in one embodiment, my invention is directed toward a vapor/liquid distributor for effecting uniform distribution of a mixed-phase reactant stream to the upper surface of a fixed-bed of catalyst particles disposed within a catalytic reaction chamber, said distributor having three pairs of chordal-form, catalyst-free volumes defined by the interior surface of said chamber and three pairs of spaced-apart chordal baffles, the baffles in each pair being disposed on opposite sides of the plane containing the central axis of said reaction chamber and parallel thereto, which distributor comprises, in cooperative relationship: (a) an outer, first pair of chordal baffles having (i) a greater height than the second and third pairs of chordal baffles and, (ii) a perforated first horizontal plate attached to the entire lower periphery thereof and contacting the interior surface of said reaction chamber, said first pair of chordal baffles defining a first pair of catalyst-free volumes with the interior surface of said reaction chamber; (b) a middle, second pair of chordal baffles (i) having an imperforate second horizontal plate attached to the entire upper periphery thereof and contacting the interior surface of said reaction chamber, and (ii) being disposed intermediate the upper and lower periphery of said first pair of chordal baffles and defining an intermediate, second pair of catalyst-free volumes therewith; (c) an inner, third pair of chordal baffles disposed a finite distance below said second horizontal plate, and having its entire lower periphery attached to said perforated first horizontal plate, said third pair of chordal baffles defining a third pair of catalyst-free volumes with said second pair of chordal baffles; and, (d) a third horizontal plate, attached at its outer periphery to the interior surface of said chamber, and having a plurality of vertical tubular conduits attached to its upper surface, said tubular conduits (i) extending upwardly through said perforated first horizontal plate and within said third pair of chordal baffles, and terminating a finite distance below said imperforated second horizontal plate, and, (ii) having a nominal diameter greater than the remaining apertures in said perforated first horizontal plate.

This embodiment may be further characterized in that the portion of said first horizontal plate between said first and third pairs of chordal baffles is imperforate. Other objects and embodiments of the present invention will become evident from the following more detailed description thereof. In one such other embodiment, a pair of imperforate horizontal baffles is disposed above the upper periphery of said first pair of chordal baffles, and (i) is attached to the interior surface of said chamber and, (ii) extends inwardly over said first and second catalyst-free volumes.

CITATION OF RELEVANT PRIOR ART

It must be recognized and acknowledged that the prior art abounds with a wide variety of devices to introduce (1) a mixed-phase reactant stream into a catalytic reaction zone, (2) a vapor and/or vapor quench stream at an intermediate locus within a fixed-bed of catalyst particles and, (3) the mixed-phase effluent from an upper catalyst bed into the next succeeding lower catalyst bed. A perusal of the appropriate Classes 23-288 and 208-146 indicates that this is the case.

For example, U.S. Pat. No. 2,981,677 (Cl. 208-146), issued Apr. 25, 1961, is illustrative of a tri-conversion zone reaction chamber for utilization in a countercurrently-conducted catalytic process; liquid flows serially in a downwardly direction while the vaporous reactant flows upwardly. In essence, the apparatus consists of a horizontal plate containing a plurality of vapor risers, in the form of bubble caps, through which liquid reactant flows downwardly; the plate supports the catalyst bed into which the risers extend. A second horizontal plate is disposed a finite distance above the catalyst bed, and contains a plurality of liquid downcomers through which liquid flows downwardly into the lower catalyst bed. The void volume between the catalyst bed and the second horizontal plate is referred to as a disengaging space; however, not all the vaporous material is separated therein. That is, a quantity thereof flows upwardly through the liquid downcomers in the horizontal plate. Details of this operation, shown graphically in FIG. 1 as conversion zone "A", are given in Column 3, Lines 31-47 (downwardly-flowing liquid) and in Column 4, Line 60 through Column 5, Line 17 (upwardly-flowing vaporous constituents). The apparatus further makes provision for a liquid quench (conduits 48, 50 and 52 in FIG. 1) as described in Column 5, Lines 45-56. Initially, it must be noted that the apparatus is peculiar to countercurrent flow of gaseous and liquid constituents. This, however, is not the most distinguishing feature with respect to the vapor/liquid mixed-phase distributor claimed and described herein. Most noteworthy is the fact that the apparatus of the reference makes no provision for a re-mixing of the separated liquid and vapor streams to create a froth for re-distribution to the next succeeding catalyst bed. Indeed, not only is it incapable of creating such a froth, to do so would effectively destroy its intended function. Further, the apparatus does not effect virtually complete separation of liquid and vapor; that is, throughout the confines of the device, liquid and vapor are in constant contact with each other.

U.S. Pat. No. 3,146,189 (Cl. 208-146), issued Aug. 25, 1964, involves a device for the initial distribution of a vapor/liquid feed stream to a fixed-bed of catalyst particles. The liquid and vaporous components are separately introduced into the catalyst bed through a horizontal plate containing liquid downcomers and vapor downcomers, the latter extending into the bed of catalyst particles and designed to afford lateral vapor flow therethrough. Separation of the mixed-phase is effected in the void space between the inlet conduit and nozzles (30 and 31), and the horizontal plate (17). Liquid collects on the plate to a level which is determined by the height of a plurality of cylindrical weirs (18); overflowing liquid is trickled downwardly into the catalyst particles through an orifice (19) in the bottom of each weir. Vapors are prevented from entering the weirs by virtue of the created liquid seal. These are caused to flow through the upper periphery of downcomers (20), downwardly therethrough and finally laterally through screening means (27) laterally into the catalyst bed. The vapor downcomers are adapted with an imperforate top plate (25) to prevent liquid from entering therein.

Although the reference recognizes the disadvantages of vapor/liquid channelling, and provides a device for alleviating the same where the reactant stream initially contacts the catalyst bed, there is neither recognition of, nor provision made with respect to channelling which occurs throughout the remainder of the catalyst particles. In short, there is no re-mixing for the creation of froth and re-distribution of the same; further, the device is incapable of so doing.

U.S. Pat. No. 3,378,349 (Cl. 23-288), issued Apr. 16, 1968, directs itself to an inner-reactor mixed-phase distribution apparatus, the principal function of which serves to thoroughly admix the reactant stream effluent with a quench stream introduced between catalyst zones (Column 1, Lines 23-37 and Column 8, Lines 17-41). Whether gaseous, or liquid quench, the device is designed for the same to be introduced directly into the mixed-phase effluent emanating from the preceding, upper bed of catalyst particles.

In contrast to the mixed-phase distribution herein described, there exists no separation of the reactant stream effluent into the individual liquid and vaporous phases. This is evident, not only from the construction of the apparatus (particularly as shown in FIG. 1), but also in the description of the manner in which the device functions; the latter is found in Column 5, Lines 1-21 and in Column 7, Lines 19-42. As indicated, both liquid and vapor constituents flow through the same downcomers immediately following disengagement from the previous bed of catalyst particles. Furthermore, there exists no creation of an intimate froth of vapor and liquid for re-distribution into the succeeding bed of catalyst particles.

Still another mixed-phase distributing device is the subject of U.S. Pat. No. 3,524,731 (Cl. 23-288), issued Aug. 18, 1970. The device is intended to ease the ill effects resulting from maldistribution (channelling) of the mixed-phase components (Column 1, Line 65 through Column 2, Line 15). Essentially, the distributing apparatus consists of a horizontal plate having inserted therein and therethrough a plurality of short tubes and a plurality of longer tubes which are notched proximate to the terminus above the horizontal plate. Functioning of the distribution device is generally described in Column 2, Lines 26-49 and in Column 4, Lines 22-46; a perusal thereof indicates that the device functions differently with high and low liquid flow rates. In the former situation, only liquid flows downwardly through the shorter tubes, while both liquid and vapor flow through the longer tubes.

Although there could be considered a separation of liquid and vapor components, only, however, in the situation of low liquid flow rates, there is no separation and re-mixing in such a manner as to create an intimate froth for re-distribution into the next succeeding bed of catalyst particles. The forth is not created merely by virtue of the fact that liquid components are flowing downwardly through tubes other than those through which the vaporous material is passed.

A flow distributor system somewhat similar to that illustrated in U.S. Pat. No. 3,146,189, hereinabove described, is the subject to U.S. Pat. No. 3,685,971 (Cl. 23-288), issued Aug. 22, 1972. The distributor is located proximate to the reactant stream inlet port and is contiguous with the inlet conduit. Its discharge end consists of a plurality of depending, spaced-apart concentric frusto-conical baffle members which produce an outward deflection of concentric, annular-form flow streams to an equivalent proportional area of the lower catalyst bed. As previously stated, there is recognition of channelling at the initial portion of the catalyst bed, and the device is intended to eliminate the same by providing uniform distribution of the mixed-phase feed stream. There is no separation, re-mixing and re-distribution of the vapor and liquid within some intermediate portion of the catalyst bed.

U.S. Pat. Nos. 3,652,450 (Cl. 280-146), issued Mar. 28, 1972, No. 3,697,416 (Cl. 208-146), issued Oct. 10, 1972 and No. 3,723,300 (Cl. 208-146), issued Mar. 27, 1973, all involve techniques for the introduction of quench streams into intermediate loci of fixed-bed catalytic reaction zones and the various devices suitable for assuring proper, uniform mixing with the mixed-phase reactant stream.

The foregoing delineated references, copies of which accompany this application, are all directed toward mixed-phase catalytic processing and the uniform distribution of the reactant stream; therefore, they are appropriate to the subject matter of the present application. In summation, there exists no teachings and/or recognition of virtually complete separation of the mixed-phase reactant stream, a re-mixing thereof to create a vapor/liquid froth and the re-distribution of the froth to a lower, succeeding bed of catalyst particles.

SUMMARY OF INVENTION

Distribution of a mixed-phase vapor/liquid reactant stream to a fixed-bed of catalyst particles, in accordance with the invention herein described and claimed, is founded upon recognition of the fact that provisions have not heretofore been afforded which will alleviate vapor/liquid segregation with resultant channelling as the reactant stream introduced across the upper surface of the catalyst bed traverses the same. At best, the devices and techniques previously developed, and perhaps currently in use, do nothing more than distribute a multiplicity of small portions of the mixed-phase reactant stream onto a like number of small areas of catalyst particles situated atop the confined bed thereof. As a result, each small portion virtually immediately commences to segregate into distinct vapor and liquid streams which combine with other smaller vapor and liquid streams to seek channelled paths through the remainder of the catalyst particles. Similarly, the use of either vaporous, or liquid quench streams, or both, to attenuate the temperature rise experienced with exothermic reactions, has been recognized as a judicious operational technique. Many methods and devices have been proposed, virtually all of which inject a multiplicity of smaller quench portions intermediate the catalyst bed; however, the effect is the same as above noted. That is, these smaller portions seek to combine with each other to produce larger segregated portions which commence to channel through the bed. Through the practice of the present technique, and the use of the device encompassed by my invention, the mixed-phase vapor/liquid reactant stream is introduced into the fixed-bed of catalyst particles in a form which resists segregation, accompanied by channelling, as the reactant stream traverses the catalyst bed.

The mixed-phase reactant stream is generally introduced into an upper void volume within the reaction chamber, and passes through a perforated horizontal plate, or screen member under which is disposed the upper surface of the bed of catalyst particles; a similar perforated plate functions as catalyst support means at the lower extremity of the catalyst bed. Where a reaction chamber contains more than one bed of catalyst particles, each is usually defined by such upper and lower perforated horizontal plates, or screen members. The vapor/liquid distributor may be installed either in the uppermost void volume above the first bed of catalyst particles, or between the two perforated horizontal plates which separate one catalyst bed from another. In many situations, it will be advantageous to install the distributor device in both locations. Where the exothermicity of the reactions indicates an expected temperature rise beyond the maximum allowable for protection of the catalyst particles, a quench stream is introduced intermediate the catalyst beds. The present device facilitates the uniform, thorough distribution thereof, whether vaporous, or liquid, and also affords uniform quenching of the reactant stream, thereby avoiding localized hot spots.

Distribution of the vapor/liquid reactant stream, as described herein, involves three distinct steps, each of which is efected in a separate, individual zone of the apparatus. The mixed-phase, for discussion and illustration purposes being presumed to be the effluent from an upper, preceding bed of catalyst particles, passes through the perforated catalyst support plate into a vapor/liquid separation zone. Through the utilization of three pairs of parallel, chordal-form catalyst-free volumes, the mixed-phase is separated into an upwardly-flowing, substantially liquid-free vapor-phase and a downwardly-flowing, substantially vapor-free liquid-phase. Liquid constituents initially passing through the perforated catalyst-support plate are prevented from becoming admixed with the separated vapor-phase by an imperforate horizontal plate which is disposed above the chordal-form volumes through which vapor is flowing. All the elements of the vapor/liquid distributor are hereinafter more thoroughly and completely described with reference to the accompanying drawings.

The flow of the liquid phase is reversed upwardly and a quasi-stagnant pool thereof is formed by overflowing a chordal weir onto a horizontal, perforated plate. Vapor-phase flow is also reversed, to assume a downward direction into a catalyst-free area (or volume) below the quasi-stagnant liquid pool. The vapors pass upwardly through the perforations, and into and through the quasi-stagnant liquid pool. This area of the device is herein referred to as the re-mixing zone wherein the vapor velocity upwardly into the pool of liquid is sufficiently high to prevent excessive liquid flow downwardly through the perforations and, more importantly, to create the vapor/liquid froth. Where a vapor quench stream is utilized, it is introduced into the separated vapor-phase proximate to the locus of vapor flow reversal. This is accomplished through the use of toroidal ring sections having perforations which direct the quench vapors downwardly. Similarly, liquid quench is introduced through perforations in a linear conduit disposed proximate to the locus of liquid flow reversal. Quench streams may consist of reactant stream components where appropriate. The term "quasi-stagnant" is used with reference to the liquid pool since it is almost immediately formed into the froth by the high velocity vapors.

The froth is directed through a plurality of downcomers which originate in a horizontal plate disposed below the perforated plate through which the vapors pass upwardly. These downcomers extend upwardly through the perforated plate and terminate in the re-mixing zone below the plane containing the upper periphery of the chordal weir. Downwardly-flowing froth passes into a catalyst-free area above the horizontal plate disposed immediately above the bed of catalyst particles, and is uniformly distributed through the apertures therein.

The vapor/liquid distribution apparatus encompassed by my inventive concept, and intended for utilization in fixed-bed catalytic reaction zones, will be further described and more fully understood upon reference to the accompanying drawings. Since these are presented for the sole purpose of illustration and to foster a complete understanding of the device and the techniques involved, they are not considered as having been drawn to an accurate scale. For any given application, the precise construction of the illustrated apparatus will be primarily dependent upon the reaction zone dimensions, the volume of catalyst disposed therein and the relative quantities of vapor and liquid which are introduced and traverse the entire catalyst bed.

BRIEF DESCRIPTION OF DRAWINGS

With brief reference to the drawings.

FIG. 3 is a partially-sectioned plan view taken downwardly substantially along the line 3—3 of FIG. 1. Liquid quench inlet ports 6 are in open communication with a substantially straight, perpendicular conduit 7 having a plurality of inwardly facing apertures 7a.

As shown in FIGS. 3 and 4, downcomers 22 are radially disposed, and in circumferential relationship with each other. The apertures in horizontal plates 10, 12, 20 and 24 are also radially disposed in circumferential relation.

In FIG. 5, the "grid" containing downcomers 22 and apertures 21 is square in its configuration. In contrast, FIG. 6 illustrates a "grid" which is essentially triangular in configuration.

DETAILED DESCRIPTION OF DRAWINGS

Figure 1:
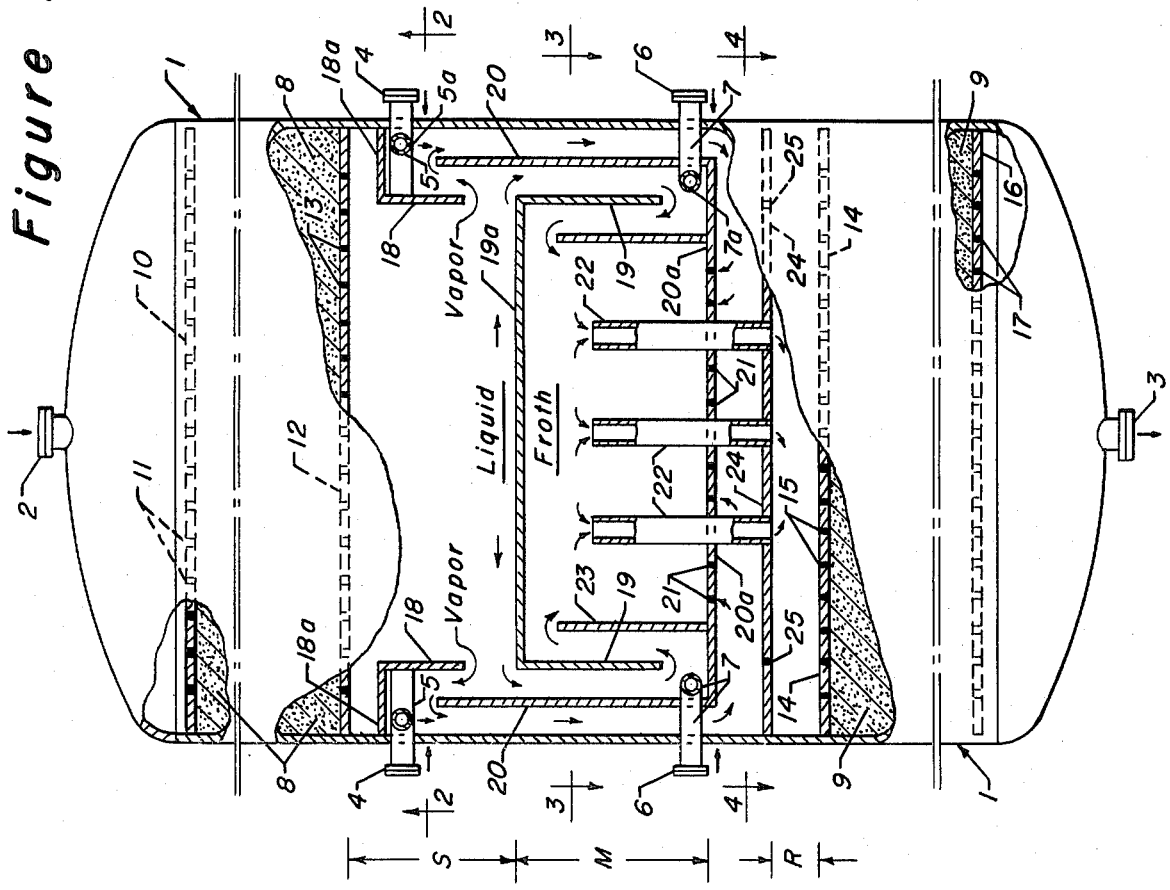
FIG. 1 is a partially-sectioned elevation of a fixed-bed catalytic reaction zone, generally indicated by numeral 1, having a reactant stream inlet port and conduit 2 and a product effluent outlet port and conduit 3. When the reactions are principally exothermic in nature, thereby producing a temperature rise as the reactant stream traverses the catalyst bed, the reaction zone is adapted with a pair of vapor quench inlet ports 4 and/or liquid quench inlet ports 6. The use of such quench streams, for the purpose of attenuating the temperature rise experienced with exothermic reactions is well known to those having the requisite skill in the petrochemical and petroleum refining arts. In this illustration, the apparatus is shown as being disposed between an upper catalyst bed 8 and a lower catalyst bed 9.

With specific reference now to FIG. 1, catalytic reaction zone 1 is shown as having two individual beds of catalyst particles 8 and 9; these are separated by the vapor/liquid distribution device which constitutes my invention. Essentially, the distributor has three separate zones each of which performs a distinct function.

Separation zone "S", between perforated, catalyst-support plate 12 and imperforate horizontal plate 19a, serves to separate vapor from liquid in the mixture emanating from catalyst bed 8. Mixing zone "M", extending downwardly from imperforate horizontal plate 19a to the perforated horizontal plate 20a, effects the intimate remixing of the previously separated vapors and liquid, thereby creating a froth. The froth is re-distributed to lower catalyst bed 9 from re-distribution zone "R", being the void space between horizontal plate 24 and perforated plate 14, the latter disposed atop catalyst bed 9.

The mixed-phase reactant stream, following the required degree of pre-heat to achieve reaction zone temperature, is introduced into catalytic reaction zone 1 by way of inlet port and conduit 2. Perforated horizontal plate, or screen member 10, containing perforations or apertures 11, defines the upper extremity of catalyst bed 8, and serves to initially distribute the reactant stream throughout the catalyst particles. The appropriate art is replete with examples of devices to effect the initial distribution of a reactant stream (existing in mixed-phase) to a catalytic reaction zone; one such device is the subject of U.S. Pat. No. 3,685,971 (Cl. 23–288R), hereinbefore discussed. The use of such a device is neither essential to, nor a part of the device encompassed by my inventive concept. However, the vapor/liquid distributor herein described may be installed in reaction chamber 1 in the area above horizontal plate 10 in order to effect initial distribution of the reactant stream to catalyst bed 8. The reactant stream traverses catalyst bed 8 and emanates therefrom through perforated, horizontal catalyst-support plate 12; apertures 13 are obviously sized to inhibit the passage of catalyst particles therethrough.

Reaction product effluent from catalyst bed 8 enters the separation zone "S" of the present vapor/liquid distributor through apertures 13; since the majority of mixed-phase operations involve reactions which are primarily exothermic in nature, the temperature of the reactant stream rises as catalyst bed 8 is traversed. A common practice is to quench this stream to lower its temperature before it continues through the remainder of the catalyst disposed within the reaction zone. In accordance with the present illustration, a pair of vaporous quench inlet ports 4 is provided; these are in open communication with a pair of toroidal ring sections 5 having apertures 5a (see FIG. 2) disposed therein to direct the vaporous quench in a downwardly direction. An imperforate horizontal baffle 18a is disposed above each of toroidal ring sections 5 to prevent the flow of liquid reactant stream constituents into the chordal-form volume through which separated vapors are flowing downwardly. Horizontal plates 18a are attached, at the outer periphery, to the interior surface of reaction chamber 1, and extend inwardly to also cover an intermediate chordal-form volume formed between chordal baffles 19 and 20. Preferably, the inside of horizontal plate 18a is adapted with a downwardly extending imperforate chordal baffle 18. The latter terminates below the upper peripheral edge of chordal baffle 20.

Vaporous reactant stream effluent from catalyst bed 8 is caused to flow upwardly through the chordal-form volume between chordal baffle 20 and chordal baffle 18. The upper edge of the former extends to a plane above that which contains the lower edge of the latter in order to prevent liquid effluent from entering the chordal-form volume created with the interior surface of the reaction zone. Vaporous effluent is admixed with the quench vapors from toroidal ring sections 5, and passed downwardly through the chordal-form downcomer formed between the interior surface of the reaction chamber and chordal baffle 20. These vapors, substantially free from liquid constituents, flow horizontally into the void volume between lower horizontal plate 24 and the upper, perforated horizontal plate 20a which is attached to the entire lower periphery of chordal baffle 20, and which contacts the interior surface of the reaction chamber at its extremities.

Liquid components in the effluent from catalyst bed 8 flow outwardly toward the interior surface of catalytic reaction zone 1 by virtue of imperforate horizontal top plate 19a which is attached to chordal baffles 19; the latter forms a second, intermediate chordal-form space with chordal baffles 20. Liquid flows downwardly through the chordal-form volume and is admixed therein with the quench liquid from conduits 7; the latter has apertures disposed along its surface which direct the quench inwardly toward chordal baffles, or weirs 23. The mixture, substantially free from vapor, flows upwardly through a third chordal-form volume between chordal baffles 19 and chordal baffles 23, creating a liquid "seal" that restricts the passage of vapor therethrough. A froth of vapors and liquid is created in mixing zone "M" as the liquid constituents which overflow baffle weirs 23 are intimately contacted with the vapors flowing upwardly through apertures 21 in horizontal plate 20a. The froth flows through a plurality of downcomers 22 into redistribution zone "R", and therefrom through apertures 15 disposed in horizontal plate 14 and into catalyst bed 9. Downcomers 22 are disposed in a manner which effects uniform distribution of the froth into the lower catalyst bed. Product effluent from catalyst bed 9 flows through apertures 17 disposed in catalyst-support plate 16, and are withdrawn from catalytic reaction zone 1 through outlet conduit and port 3.

Figure 2:
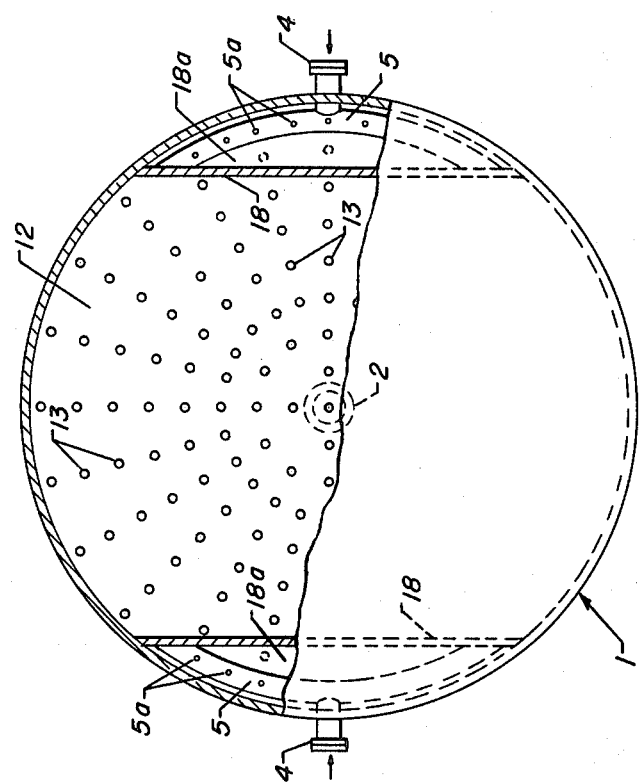
FIG. 2 is a partially-sectional plan view taken upwardly substantially along the line 2—2 of FIG. 1. Vapor quench inlet ports 4 are shown as communicating with a pair of toroidal ring segments 5, having a plurality of downwardly-directed apertures 5a; this construction is preferred since it enhances the uniform distribution of the vaporous quench stream.
Figure 4:
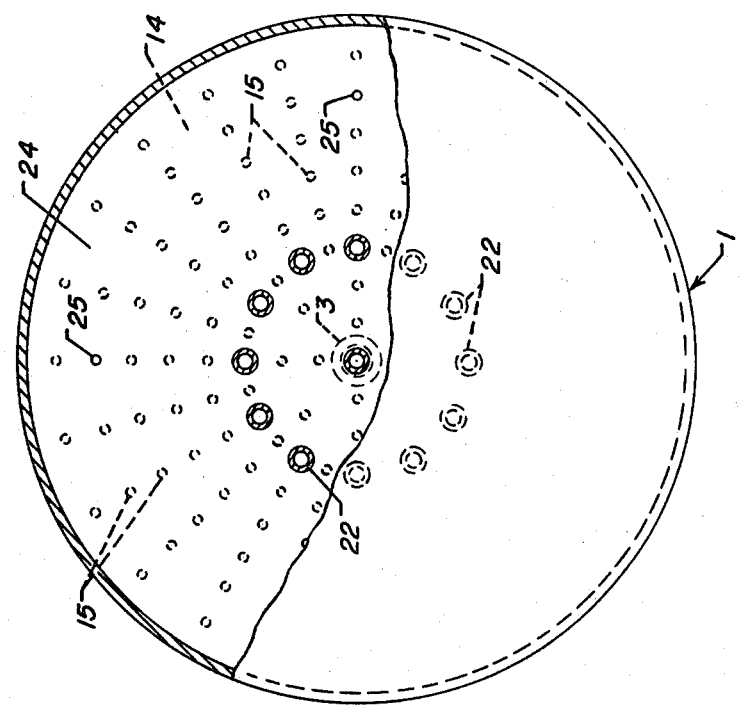
FIG. 4 is a partially-sectioned plan view taken downwardly substantially along the line 4—4 of FIG. 1. Indicated are a plurality (in this illustratation 4) of weep holes 25 which are employed to prevent minor quantities of entrained liquid from accumulating on tray 24. It will be noted from FIGS. 2 and 3, that the principal components of the illustrated vapor/liquid distribution device are chordal, and parallel to the vertical plane containing the central axis of the catalytic reaction chamber.
Figure 3:
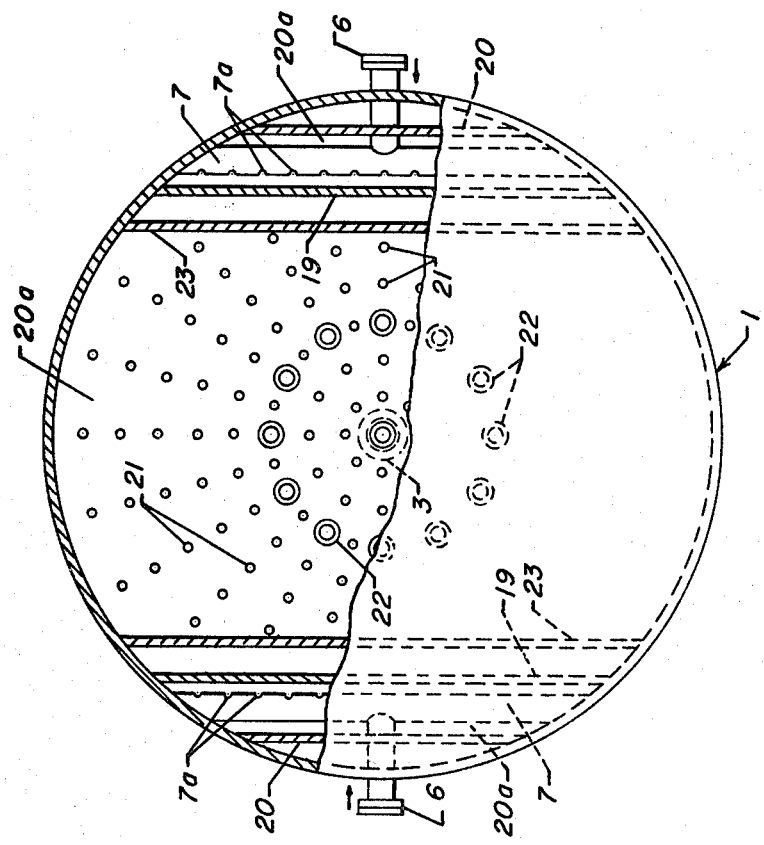

FIG. 2, the partially-sectioned plan view taken upwardly substantially along the line 2—2 of FIG. 1, is presented for the principal purpose of illustrating the relationship of toroidal ring sections 5, having downwardly directing apertures 5a circumferentially disposed therein, and imperforate horizontal plates 18a, adapted with downwardly extending chordal baffles 18. Similarly, FIG. 3, the partially-sectioned plan view taken downwardly substantially along the line 3—3 of FIG. 1, illustrates the relationship of liquid distribution conduits 7, having inwardly-directing apertures 7a disposed therein, and chordal baffles 23. Also, the relationship of froth downcomers 22, which extend through the horizontal plate 20a, and the apertures 21 which are radially and circumferentially disposed therein. FIG. 4, being the partially-sectioned plan view taken substantially along the line 4—4 of FIG. 1, is intended to show the liquid weep holes 25 (solid lines) which are circumferentially disposed in horizontal plate 24.

Figure 6:
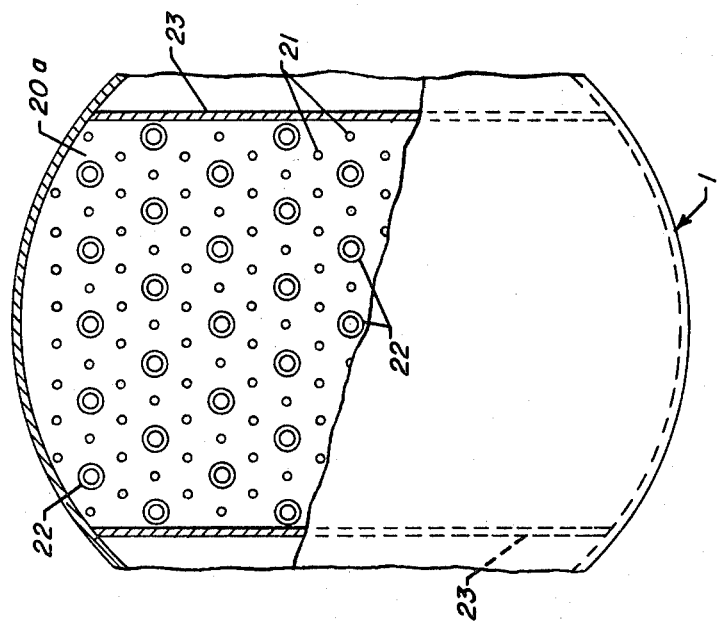
FIGS. 5 and 6 are partial sections similar to FIG. 3; however, they illustrate modifications to the layout of downcomers 22 and apertures 21 within the confines of the pair of chordal baffles 23.
Figure 5:
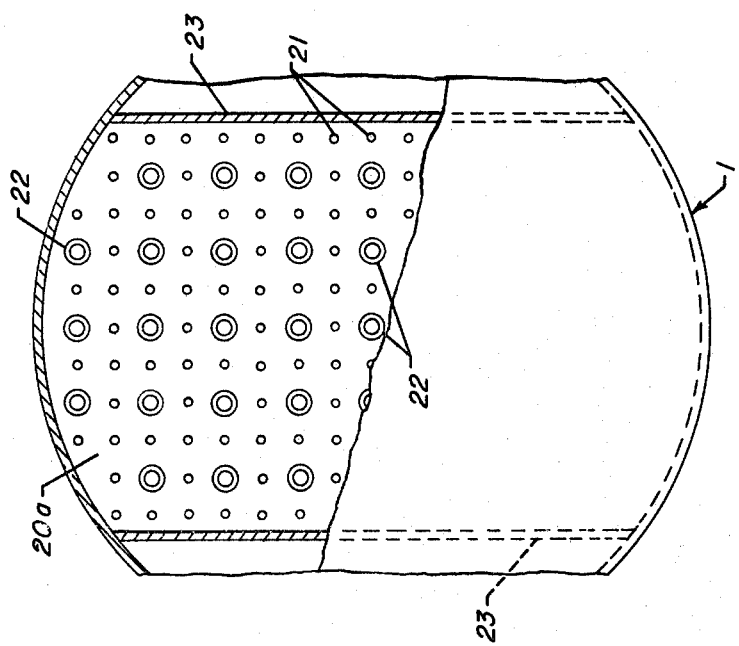

As previously set forth, FIGS. 5 and 6 are partially-sectioned plan views presented to illustrate the layout of froth downcomers 22 and apertures 21 in squared and triangular "grids", respectively. Although a wide variety of tube spacings may be utilized, not necessarily with equivalent results, the present apparatus will utilize grid arrays which are circumferential (FIGS. 3 and 4), square (FIG. 5) and triangular (FIG. 6); grids of the square and triangular configurations are particularly preferred.

It will be noted that the distribution device encompassed by my inventive concept permits the virtually complete separation of vaporous and liquid phases; this affords the re-mixing to create an intimate vapor/liquid froth much the same as that found in fractionation columns by the upward flow of vapors through a liquid phase. The device also affords quenching with vapor and/or liquid prior to the creation of the froth in order to quench the mixture uniformly. Other benefits and advantages will become apparent to those possessing the requisite skill in the appropriate art.

I claim as my invention:

1. A vapor/liquid distributor for effecting uniform distribution of a mixed-phase reactant stream to the upper surface of a fixed-bed of catalyst particles disposed within a catalytic reaction chamber, said distributor having three pairs of chordal-form, catalyst-free volumes defined by the interior surface of said chamber and three pairs of spaced-apart chordal baffles, said chordal baffles of each pair forming said catalyst free volumes being disposed on opposite sides of the plane containing the central axis of said reaction chamber, said plane situated perpendicular to said fixed-bed of catalyst particles and said chordal baffles situated parallel to said plane of said central axis, which distributor comprises, in cooperative relationship:

(a) an outer, first pair of chordal baffles having (i) a greater height than the second and third pairs of chordal baffles and, (ii) a perforated first horizontal plate attached to the entire lower periphery thereof and contacting the interior surface of said reaction chamber, said first pair of chordal baffles defining first areas of catalyst-free volume with the interior surface of said reaction chamber;

(b) a middle, second pair of chordal baffles (i) having an imperforate second horizontal plate attached to the entire upper periphery thereof and contacting the interior surface of said reaction chamber, and (ii) being disposed intermediate the upper and lower periphery of said first pair of chordal baffles and defining intermediate, second areas of catalyst-free volume therewith;

(c) an inner, third pair of chordal baffles disposed a finite distance below said second horizontal plate, and having its entire lower periphery attached to said perforated first horizontal plate, said third pair of chordal baffles defining third areas of catalyst-free volume with said second pair of chordal baffles; and (d) a third horizontal plate, attached at its outer periphery to the interior surface of said chamber, and having a plurality of vertical tubular conduits attached to its upper surface, said tubular conduits (i) extending upwardly through said perforated first horizontal plate and within said third pair of chordal baffles, and terminating a finite distance below said imperforate second horizontal plate, and, (ii) having a nominal diameter greater than the remaining apertures in said perforated first horizontal plate.

2. The vapor/liquid distributor of claim 1 further characterized in that the portion of said first horizontal plate between said first and third pairs of chordal baffles is imperforate.

3. The vapor/liquid distributor of claim 1 further characterized in that said tubular conduits are disposed through said perforated first horizontal plate such that the axes thereof are in the form of a circumferential grid.

4. The vapor/liquid distributor of claim 1 further characterized in that said tubular conduits are disposed through said perforated first horizontal plate such that the axes thereof are in the form of a squared grid.

5. The vapor/liquid distributor of claim 1 further characterized in that said tubular conduits are disposed through said perforated first horizontal plate such that the axes thereof are in the form of a triangular grid.

6. The vapor/liquid distributor of claim 1 further characterized in that a perforated fourth horizontal plate, attached at its outer periphery to the interior surface of said chamber, is disposed a finite distance below said third horizontal plate.

7. The vapor/liquid distributor of claim 1 further characterized in that a pair of imperforate horizontal baffles is disposed above the upper periphery of said first pair of chordal baffles, and (i) is attached to the interior surface of said chamber and, (ii) extends inwardly over said first and second areas of catalyst-free volumes.

* * * * *